(12) United States Patent
Hellkvist et al.

(10) Patent No.: US 9,942,147 B2
(45) Date of Patent: Apr. 10, 2018

(54) METHOD NODES AND COMPUTER PROGRAM FOR ENABLING OF DATA TRAFFIC SEPARATION

(71) Applicant: TELEFONAKTIEBOLAGET LM ERICSSON (PUBL), Stockholm (SE)

(72) Inventors: Stefan Hellkvist, Stockholm (SE); Joacim Halén, San Jose, CA (US); Jan-Erik Mångs, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 34 days.

(21) Appl. No.: 15/112,065

(22) PCT Filed: Jan. 20, 2014

(86) PCT No.: PCT/SE2014/050059
§ 371 (c)(1),
(2) Date: Jul. 15, 2016

(87) PCT Pub. No.: WO2015/108458
PCT Pub. Date: Jul. 23, 2015

(65) Prior Publication Data
US 2016/0337238 A1  Nov. 17, 2016

(51) Int. Cl.
H04L 12/28    (2006.01)
H04L 12/743   (2013.01)
H04L 12/24    (2006.01)
H04L 12/46    (2006.01)

(52) U.S. Cl.
CPC ...... *H04L 45/7453* (2013.01); *H04L 12/4633* (2013.01); *H04L 41/0823* (2013.01); *H04L 41/12* (2013.01)

(58) Field of Classification Search
CPC combination set(s) only.
See application file for complete search history.

(56) References Cited

U.S. PATENT DOCUMENTS 8,300,532 B1    10/2012  Venkatramani et al.
8,717,895 B2 *   5/2014  Koponen ............ H04L 12/4633
                                              370/235
9,461,967 B2 *  10/2016  Zuk ...................... H04L 63/0227
9,521,028 B2 *  12/2016  van Bemmel .......... H04L 29/06
(Continued)

FOREIGN PATENT DOCUMENTS

WO    2012139819 A1   10/2012

OTHER PUBLICATIONS

Zhang et al., StEERING: A Software-Defined Networking for Inline Service Chaining, 21st IEEE International Conference on Network Protocols (ICNP), Oct. 7, 2013.
(Continued)

*Primary Examiner* — Frank Duong

(57) ABSTRACT

A method, unit and computer program performed by a packet separation unit in a communications network for enabling of data traffic separation comprising: obtaining a traffic rule set from a rule manager, determining a complementary rule related to the traffic rule set, arranging the rules in an hierarchical order such that a received data packet will be evaluated with the rule with the most likeliness to comply with a received data packet, receiving the data packet, directing the data packet to a local shared environment.

20 Claims, 10 Drawing Sheets

(56) References Cited

U.S. PATENT DOCUMENTS

2013/0054761 A1* 2/2013 Kempf ............... H04L 12/4633
709/220
2013/0283374 A1* 10/2013 Zisapel .............. H04L 63/1441
726/22

OTHER PUBLICATIONS

Veeramani, et al., Constructing Scalable Hierarchical Switched OpenFlow Network Using Adaptive Replacement of Flow Table Management, IEEE International Conference on Advanced Networks and Telecommunications Systems (ANTS), Dec. 15, 2013.
Kempf, et al., Moving the Mobile Evolved Packet Core to the Cloud, 2012 Fifth International Workshop on Selected Topics in Mobile and Wireless Computing, Barcelona Spain, Oct. 8-10, 2012.

* cited by examiner

METHOD NODES AND COMPUTER PROGRAM FOR ENABLING OF DATA TRAFFIC SEPARATION

This application is a 371 of International Application No. PCT/SE2014/050059, filed Jan. 20, 2014, the disclosure of which is fully incorporated herein by reference.

TECHNICAL FIELD

The present disclosure relates generally to methods, nodes and computer programs for enabling of data traffic separation.

BACKGROUND

Today's development in information technology and communication services is moving from local services to shared services. Such shared services may start from sharing the same data center with high security facilities, cooling, redundant electricity supply and redundant bandwidth. Shared services may range over shared computer hardware, shared operating systems, all the way to shared computing power distributed over a number of physical computers. There are a number of similar terms for shared services, such as hosted services, virtualized servers, virtualized computing, networked computing, clouds, computer clouds and cloud computing, not limiting to similar terms.

Centrally located resources, or resources distributed to different continents around the globe linked together such that they form a common pool of resources, are typically beneficial from a cost perspective. A few examples of resources which may be suitable to share for the purpose to save costs are; back-up diesel generators, doubled communication links provided from separated and different physical directions, hardware computer equipment, single point for software maintenance and updates of one system, instead of potentially many systems to maintain.

There are a number of benefits of sharing resources and loosen the relation between software based services and computer hardware. It provides cost efficient solutions, flexibility for service providers who do not have to worry about the burden of computer hardware.

However, the trend to move services higher and higher up in the network architecture and sometimes also longer away in physical distance may cause problems. An increasing problem of today may be the fact that the communications networks are highly utilized and therefore cannot handle expected large increases of data traffic without significant investments. Sometimes it might be acceptable that signaling may be carried over long distances, because the signaling only requires limited bandwidth, but the following traffic related to the signaling may less desired to carry longer than necessary. Sometimes the signaling itself would benefit of a shorter path, because in a situation with many router hops and high network load, latency and jitter may affect service performance.

Further is more and more type of mass media, such as newspapers and broadcast type of services moving into the communications networks. An effect of that is that the load on the communications network increases, with a mix of common content as well as highly personalized content. News content may be more or less common, but advertising may be rather personalized, or at least not directly associated with the news content or originating from the same source as the news content.

SUMMARY

It is an object of the invention to address at least some of the problems and issues outlined above. It is possible to achieve these objects and others by using a method and an apparatus as defined in the attached independent claims.

According to one aspect, a method performed by a packet separation unit in a communications network is provided, for enabling of data traffic separation. The method comprises obtaining a traffic rule set from a rule manager. The method comprises determining a complementary rule related to the traffic rule set. The method comprises arranging the rules in a hierarchical order such that a received data packet will be evaluated with the rule with the most likeliness to comply with a received data packet. The method comprises receiving the data packet. The method comprises directing the data packet to a local shared environment.

An advantage with direction of a data packet to a local shared environment may be to enable short network latency for applications. Another advantage with direction of a data packet to a local shared environment is to minimize bandwidth utilization in the network access or the network backhaul.

According to another aspect, a method performed by a controller in a communications network is provided, for enabling of data traffic separation. The method comprises receiving a data packet via a communication interface. The method comprises evaluating the data packet with a traffic rule set in a packet separation unit and, when the data packet complies with the traffic rule, directing the data packet via the communication interface to a local shared environment.

According to another aspect, a method performed by a system in a communications network is provided, for enabling of data traffic separation. The method comprises obtaining a service deployment instruction by a resource manager. The method comprises generating a traffic rule set based on the service deployment instruction by the resource manager. The method comprises transmitting the traffic rule set to a rule manager from the resource manager. The method comprises deploying the traffic rule set in a packet separation unit by the rule manager. The method comprises generating a virtual machine in a local shared environment for reception of data packets complying with the traffic rule set by the resource manager, thereby enabling of data traffic separation to a local shared environment.

According to another aspect, a packet separation unit in a communications network apparatus is provided, for enabling of data traffic separation comprising processing means. The packet separation unit is adapted to obtain a traffic rule set from a rule manager. The packet separation unit is adapted to determine a complementary rule related to the traffic rule set. The packet separation unit is adapted to arrange the rules in a hierarchical order such that a received data packet will be evaluated with the rule with the most likeliness to comply with a received data packet. The packet separation unit is adapted to receive the data packet. The packet separation unit is adapted to direct the data packet to a local shared environment.

According to another aspect, a controller in a communications network is provided, for enabling of data traffic separation comprising processing means. The controller is adapted to receive a data packet via a communication interface. The controller is adapted to evaluate the data packet with a traffic rule set in a packet separation unit and, when the data packet complies with the traffic rule, direct the data packet via the communication interface to a local shared environment.

According to another aspect, a system in a communications network is provided, for enabling of data traffic separation comprising processing means. The system is adapted to obtain a service deployment instruction by a resource manager. The system is adapted to generate a traffic rule set based on the service deployment instruction by the resource manager. The system is adapted to transmit the traffic rule set to a rule manager from the resource manager. The system is adapted to deploy the traffic rule set in a packet separation unit by the rule manager. The system is adapted to generate a virtual machine in a local shared environment for reception of data packets complying with the traffic rule set by the resource manager, thereby enabling of data traffic separation to a local shared environment.

According to another aspect, the packet separation unit comprising the processing means, comprise a processor and a memory and wherein the memory contains instructions executable by said processor.

According to another aspect, the controller comprising the processing means, comprise a processor and a memory and wherein the memory contains instructions executable by said processor.

According to another aspect, the system comprising the processing means, comprise a processor and a memory and wherein the memory contains instructions executable by said processor.

According to another aspect, a packet separation unit in a communications network is provided, for enabling of data traffic separation. The packet separation unit comprises a rule obtaining unit for obtaining a traffic rule set from a rule manager. The packet separation unit comprises a rule determination unit for determining a complementary rule related to the traffic rule set. The packet separation unit comprises a rule arranging unit for arranging the rules in an hierarchical order such that a received data packet will first be evaluated with the rule with the most likeliness to comply with a received data packet, wherein a traffic directing unit for direction of a received data packet which complies with the traffic rule set to a local shared environment, instead of to a network core.

According to another aspect, a controller in a communications network is provided for enabling of data traffic separation. The controller comprises a communications interface for reception of a data packet. The controller comprises a packet separation unit for evaluation of the data packet with a traffic rule set in the packet separation unit and, when the data packet complies with the traffic rule the communications interface is arranged for direction of the data packet to a local shared environment.

According to another aspect, a system in a communications network is provided for enabling of data traffic separation. The system comprises a resource manager for obtaining of a service deployment instruction. The system comprises the resource manager for generation of a traffic rule set based on the service deployment instruction. The system comprises the resource manager for transmission of the traffic rule set to a rule manager. The system comprises the rule manager for deploying of the traffic rule set in a packet separation unit. The system comprises the resource manager for generation of a virtual machine in a local shared environment for reception of data packets complying with the traffic rule set by, thereby enabling of data traffic separation to a local shared environment.

The above methods, unit, controller, computer program and instructions executable by a processor may be configured and implemented according to different optional embodiments. In one possible embodiment, the complimentary rule may be based on a hashed data structure. One possible embodiment comprises, evaluating the data packet relative to the complimentary rule and when the evaluation indicates non-compliance, evaluating the data packet relative to the traffic rule set and when the evaluation data indicates compliance, the data packet may be directed to the local shared environment. In one possible embodiment, compliance data may be associated with the data packet which indicates the complying traffic rule set.

In one possible embodiment, evaluation of a data packet may be performed based on at least one of: pattern matching, protocol, destination address, source address, destination port, source port, or user equipment ID. In one possible embodiment, the traffic rule set may be common for data packets from a group of user equipment's or, the traffic rule set may be individual for a data packet from a user equipment. In one possible embodiment, the data packet may be directed via a tunnel to the local shared environment. In one possible embodiment, the rule manager may verify a new traffic rule consistency with the traffic rule set. In one possible embodiment, a data packet may be received by a traffic router unit in the local shared environment, wherein the traffic router unit routes a received data packed based on compliance data associated with the data packet to a virtual machine related to the compliance data.

An advantage with the solution may be the possibility to deploy applications in the access network similarly to how application may be deployed in a computer cloud environment. Another advantage may be to deploy applications in the network access, seamlessly for application developers, or when it is beneficial from a network standpoint.

An advantage may be to adopt applications for individual usage patterns, for local usage patterns, or usage changes over time.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to provision and operate a local shared resource distributed in a network. The shared resource may be a cloud type of service. Shared resources such as computer clouds are usually located centrally in a network core or completely outside of the network, for example the Internet. However, the increased network load created by user data traffic may be better handled in the access level of the network, or close to the access for some types of content or services. This solution proposes to provision a local shared environment in the vicinity of the access network. It is further proposed to separate some of the data traffic in the access network and direct the separated data traffic to the local shared service.

When a service in a network becomes locally intensive or a burden for the backhaul of a communications network, a decision may be taken to deploy a virtual machine in the local shared environment. When the virtual machine is operational, the suitable traffic may be separated in the network access and routed to the local shared environment. A proper set of well-organized rules, may serve for a smooth separation of the data traffic to the network core and the local shared environment.

In a situation with a mobile access, the traffic separation may be handled in a network node or in the radio base station. The local shared environment may be located in the vicinity of the network node, or co-located with the network node or collocated with the base station. By separation of traffic in the access to a virtual machine of a local shared environment in the vicinity of the access, it may be possible to optimize the traffic. When a specific content is demanded from a particular area it is possible to deploy a virtual machine handling the content load more or less instantaneously. Examples may be news content or popular movies, not limiting to other examples. When a subscriber has requested a premium service, such as for example firewalling, it may be possible to deploy a virtual machine for the firewall service, where the subscriber typically is located, and thereby avoid the need to bring data traffic to a centrally located firewall service in the network core. The rules for separation of data traffic may be applicable on both destination address and port, as well as on source address and port of data packets carrying the data traffic.

Other aspects may also be subject for traffic separation. An example of service which may be suitable for operation in a local shared environment may be legal intercept. In such an example, it may be desired that the traffic from a particular subscriber is handled as close to the subscriber as possible. And by application of adopted rules, the interception may only be performed between the subscriber and particular other subscribers or destinations. Thereby may unwanted excess data be avoided. Now the solution will be described in more detail.

Figure 1:
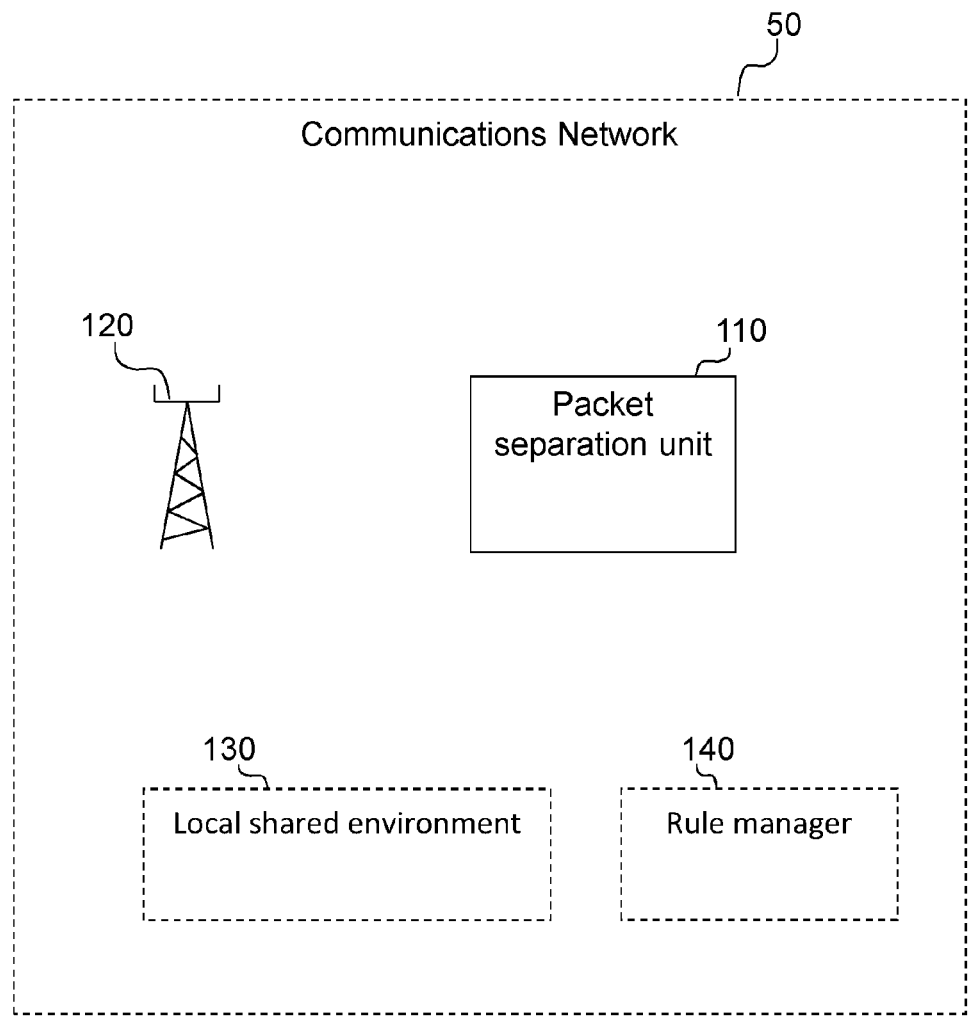
FIG. 1 is a block diagram illustrating the solution, according to some possible embodiments.

FIG. 1 illustrates an overview of a communications network 50, such as a mobile communications network or a fixed line communications network for telephony, data and Internet. The packet separation unit 110 is adopted for separation of data traffic with data packets. The data packets may be coming from a base station 120, such as an eNodeB, or other access nodes. Examples of other access nodes may be GSM base station, 3G base station, IP-based access router (Internet Protocol), FTTx-access (Fiber-to-the-X), xDSL-router (X Digital Subscriber Line), WLAN-access point (Wireless Local Area Network), WiMAX access point (Worldwide Interoperability for Microwave Access) or fixed wireless access point, not limiting to other types of access solutions. FIG. 1 also shows a local shared environment 130 and a rule manager 140, further described below.

Figure 2:
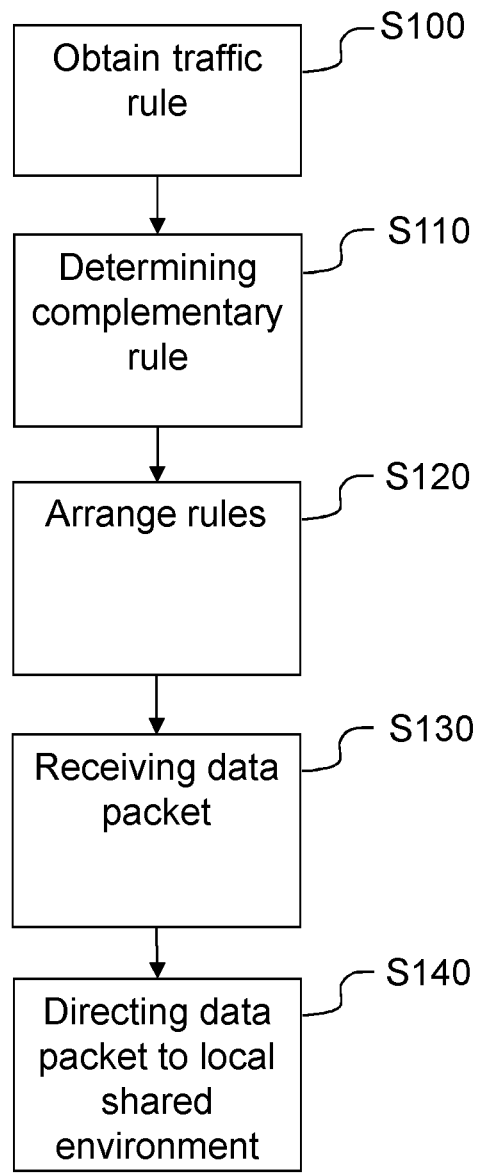
FIG. 2 is a flow chart illustrating a procedure in a packet separation node, according to possible embodiments.

FIG. 2 illustrates a flowchart of an embodiment of a method performed by a packet separation unit 110 in a communications network 50 for enabling of data traffic separation. The method comprises obtaining S100 a traffic rule set from a rule manager 140. The method comprises determining S110 a complementary rule related to the traffic rule set. The method comprises arranging S120 the rules in an hierarchical order such that a received data packet will be evaluated with the rule with the most likeliness to comply with a received data packet. The method comprises receiving S130 a data packet. The method comprises directing S140 the data packet to a local shared environment.

The packet separation unit 110 may separate traffic from a base station 120 or similar wireline access point, traffic which is addressed to a network core. The packet separation unit 110 may be co-located with the base station 120, integrated with the base station 120, or located somewhere in the access network or in a backhaul network connecting the access network to the network core. The packet separation unit 110 may use rules for how to separate data packets, according to the rule manager 140. When the packet separation unit 110 has obtained the traffic rule set, the packet separation unit 110 will determine a complementary rule. The complementary rule may be seen as a rule which is a complement for all other rules in a traffic rule set. In an embodiment the packet separation unit 110 may be using a plurality of traffic rule sets. In such a situation, the complementary rule is the common complementary rule for all traffic rule sets.

The network core may comprise core network functions such as: a service unit which operates services which are terminated by the base station 120, a radio unit, central switch unit, Mobile Gateway (MGW), Mobile Soft Switch (MSS), Serving GPRS Node (SGSN), router, border gateway router, various applications servers, just no mention a few examples.

Rules in a traffic rule set, or rules from a plurality of traffic rules sets, may be organized in a default order, for example in an hierarchical order. Thereby may the rules be applied one by one at data packets, for evaluation if the data packet is compliant with a particular rule. As long as the evaluation indicates that the rule not is compliant with a rule, the procedure may continue to the next rule until a match. However, over time it may be concluded that some rules will have a higher rate of data packet compliance. This may be performed by storing statistics of data packet compliance with individual rules. Such statistics may be stored in a compliance database. When a suitable amount of statistical data has been collected in the compliance database, the rules may be arranged or rearranged such that the rule with the greatest likeliness to comply with a received data packet may be first in the hierarchy. An advantage with arranging the rules is that the time for the evaluation procedure may be kept to a minimum. In a situation where most of the data packets should be directed to network core, the complementing rule will be arranged first in the hierarchy. Thereby will most of the data packets only need to be evaluated with one rule, the complementary rule. In an embodiment of the solution most of the data packets will be routed directly to the network core. In such a scenario, most of the data packet will only be matched against the complementary rule. The complementary rule is based on all other rules, or traffic rule sets. The complementary rule may indicate whether a data packet will match a rule or not.

When a received data packet complies with the traffic rule set, or a rule within the traffic rule set, the data packet should be directed to the local shared environment. If the received data packet is compliant with the complementary rule, it should be directed to the network core, or any other default route for data traffic which not is compliant with a traffic rule set of a single rule within a traffic rule set.

Figure 3:
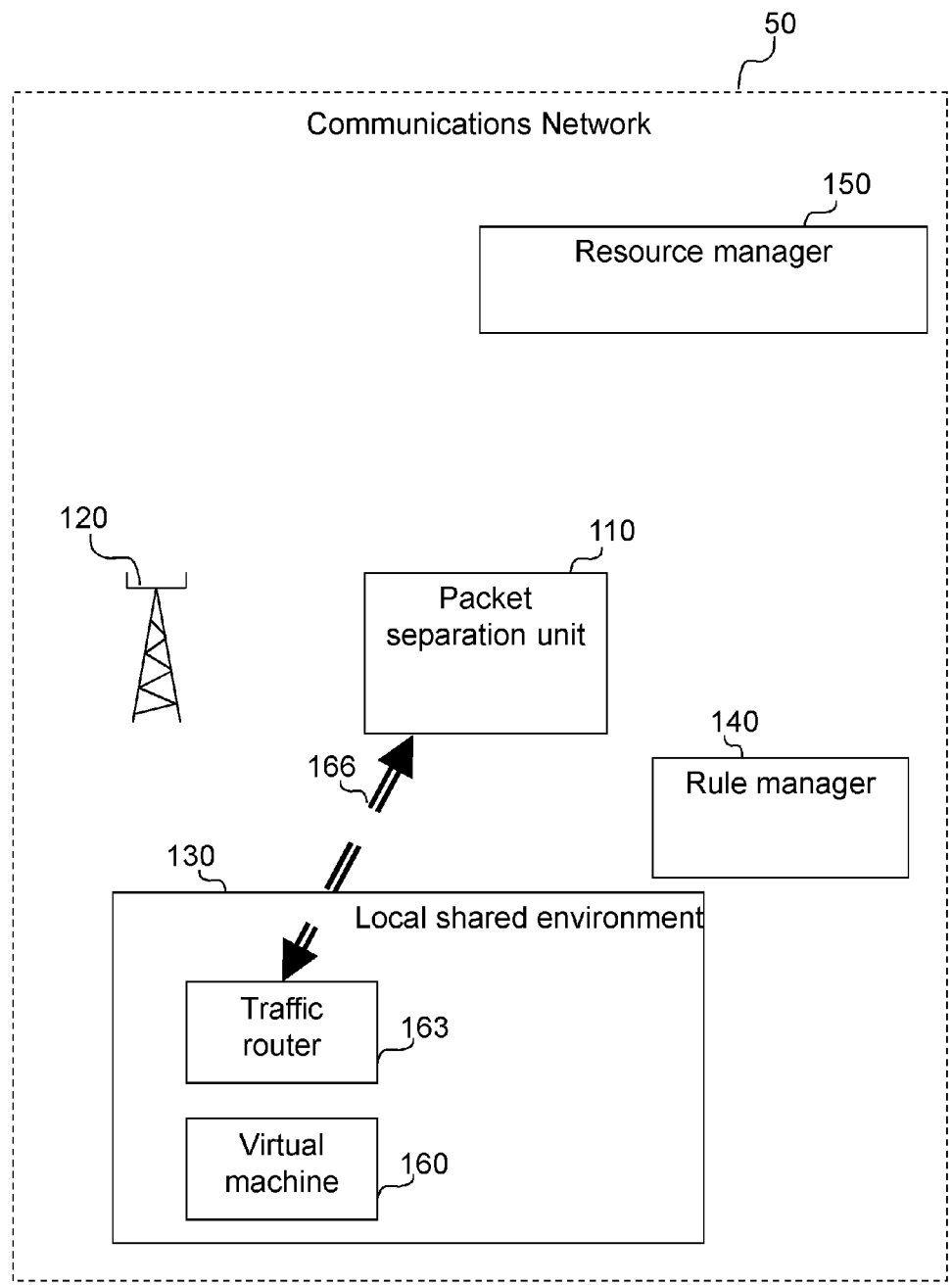
FIG. 3 is a block diagram illustrating a system, according to some further possible embodiments.

FIG. 3 illustrates an embodiment of the solution. The local shared environment 130 may be managed by a resource manager 150, such as a normal resource manager or a cloud manager. The local shared environment 130 may be managed by a specific management entity for management of local shared environments 130. The local shared environment 130 may be comprising computer software, computer hardware, for example power supply, cooling network connectivity, CPU-capacity (Central Processing Unit), memory, storage, not limiting to other hardware. The local shared environment 130 may further comprise software for example local management, such as hypervisor, operating system, database, not limiting to other types of software normally used in shared environment. The resource manager 150 may be located in the local shared environment 130 or outside, for example in a network core.

The resource manager 150 may deploy a virtual machine 160 in the local shared environment 130. The virtual machine 160 may handle data traffic or data packets, which has been directed from the packet separation unit 110. The traffic router unit 163 may handle communication with the virtual machines 160.

In an embodiment of the solution, the complimentary rule may be based on a hashed data structure. An advantage with using a hashed data structure is that when evaluating if a data packet is compliant with the complementary rule, is that the evaluation may be fast. If the hashed complementary rule is seen as a pattern, the evaluation may be CPU-efficient. By usage of a hashed data structure, the evaluation of a data packet may be performed on a fixed time, independent of how many rules or traffic rule sets that currently is used in the solution. Usage of a hashed data structure may also lead to a constant memory usage for the complementary rule, i.e. the number of rules or traffic rules sets related to the complementary rule may not increase the memory usage with increasing number of rules or traffic rule sets. This characteristic may enable caching of the complementary rule in the CPU, which is faster than if the CPU needs to retrieve the complementary rule from an external memory storage.

In an embodiment of the solution, a received data packet may be evaluated relative to the complimentary rule and when the evaluation indicates non-compliance, the data packet may be evaluated relative to the traffic rule set. When the evaluation data indicates compliance, the data packet is directed to the local shared environment 130.

In an embodiment of the solution, compliance data may be associated with the data packet which indicates the complying traffic rule set. Such compliance data may indicate with which traffic rule set or with which rule a particular data packet was compliant. The compliance data may be associated with the data packet by adding the compliance data in suitable field in the data packet. In an example of TCP/IP (Transfer Control Protocol/Internet Protocol) a suitable field in the IP header may be used. In an example of Ethernet, a suitable field in the Ethernet header may be used, a non-limiting example is the VLAN-field (Virtual Local Area Network). The compliance data may be associated with the data packet by encapsulation of the data packet in an encapsulation packet. A few examples of an encapsulation packet may be a UDP packet (User Datagram Protocol) or VLAN Ethernet frame. The data packet may than be encapsulated by an UDP packet or an Ethernet frame. Other non-limiting examples of tunneling are GRE-tunneling (Generic Routing Encapsulation) or GTP tunneling (GPRS Tunneling Protocol)

An advantage with associating compliance data with the data packet, may be that a receiver of the data packet is provided some information about with which rule or traffic rule set the data packet was compliant, and therefore may be provided an indication of how the packet should be handled. An example may be when a traffic router unit 163 may be used in the local shared environment 130. If the traffic router unit 163 reads the compliance data, it may also be able to interpret to which virtual machine 160 the data packet should be routed. The interpretation may be simpler than performance of the same or similar evaluation as the packet separation unit has performed.

In an embodiment of the solution, evaluation of a data packet may be performed based on at least one of: pattern matching, protocol, destination address, source address, destination port, source port, or user equipment ID. A received data packet may comprise protocol information, a destination address, destination port, source address and a source port. The evaluation of a data packet may be carried out as a shallow packet inspection of the data packet. The evaluation of a data packet may be carried out as a stateless or stateful packet inspection of the data packet. Evaluation of a data packet may also be carried out based on network parameters such as Rank Indicator (RI), Reference Signal Received Power (RSRP), Hybrid Automatic Repeat Request (HARQ) feedback, Channel Quality Information (CQI), Precoding Matrix Indicator (PMI), or Transport Block Size (TBS).

Evaluation of a data packet may be performed based on an end user equipment's characteristics, such as the abovementioned source address or protocol indicating a used service or application, or user equipment ID. Evaluation of a data packet may be performed based on a target service, such as the above mentioned destination address, destination port or similar.

However, evaluation of a data packet may be performed on the network load in the particular mobile cell, or in the radio network access in a particular area. Evaluation may further be performed based on for example time of the day, day in the week, consumed amount of data during a determined period of time. The exemplifying evaluations may be combined in different ways to achieve a desired result. A few illustrating non-limiting examples are: Evaluate all TCP-data packets with destination port 80 as compliant, when the network load in the radio access cell is above 40%. Evaluate data packets as compliant when with a particular protocol, destination address, source address, destination port, source port, when a user equipment is of a particular type, in a particular area and the network load is above a particular threshold. Evaluate data packets as compliant when a user equipment has consumed more than a predetermined amount of data over a predetermined time period, when the network load is above a particular threshold.

In an embodiment of the solution, the traffic rule set may be common for data packets from a group of user equipment's. A traffic rule set may be individual for a data packet from a user equipment. Certain services may be potentially used by all users and therefore accessed from potentially all user equipment's. It may therefore be suitable to apply to all services. Examples of such services may be general content services such as news or entertainment, which may create load on the backhaul and core network and which may be identical for all users. A traffic rule set for an individual user equipment may be advantageous where a user required premium services and might be paying for a different service schema, using a personalized service, or in a situation where personalized advertising might be delivered together with non-personalized news content.

In an embodiment of the solution, data packets may be directed via a tunnel 166 to the local shared environment. When data traffic comprising data packets are received to the packet separation unit 130, the tunnel 166 may have the advantage of sending data packets directly from the packet separation unit 130 to the traffic router unit 163. Examples of the tunnel 166 may be a VLAN-tagged Ethernet frames, VPN-tagged Ethernet frames (Virtual Private Network) or VPN-tagged IP-packets, MPLS-tagged IP-packets (Multi-protocol switching).

Figure 4:
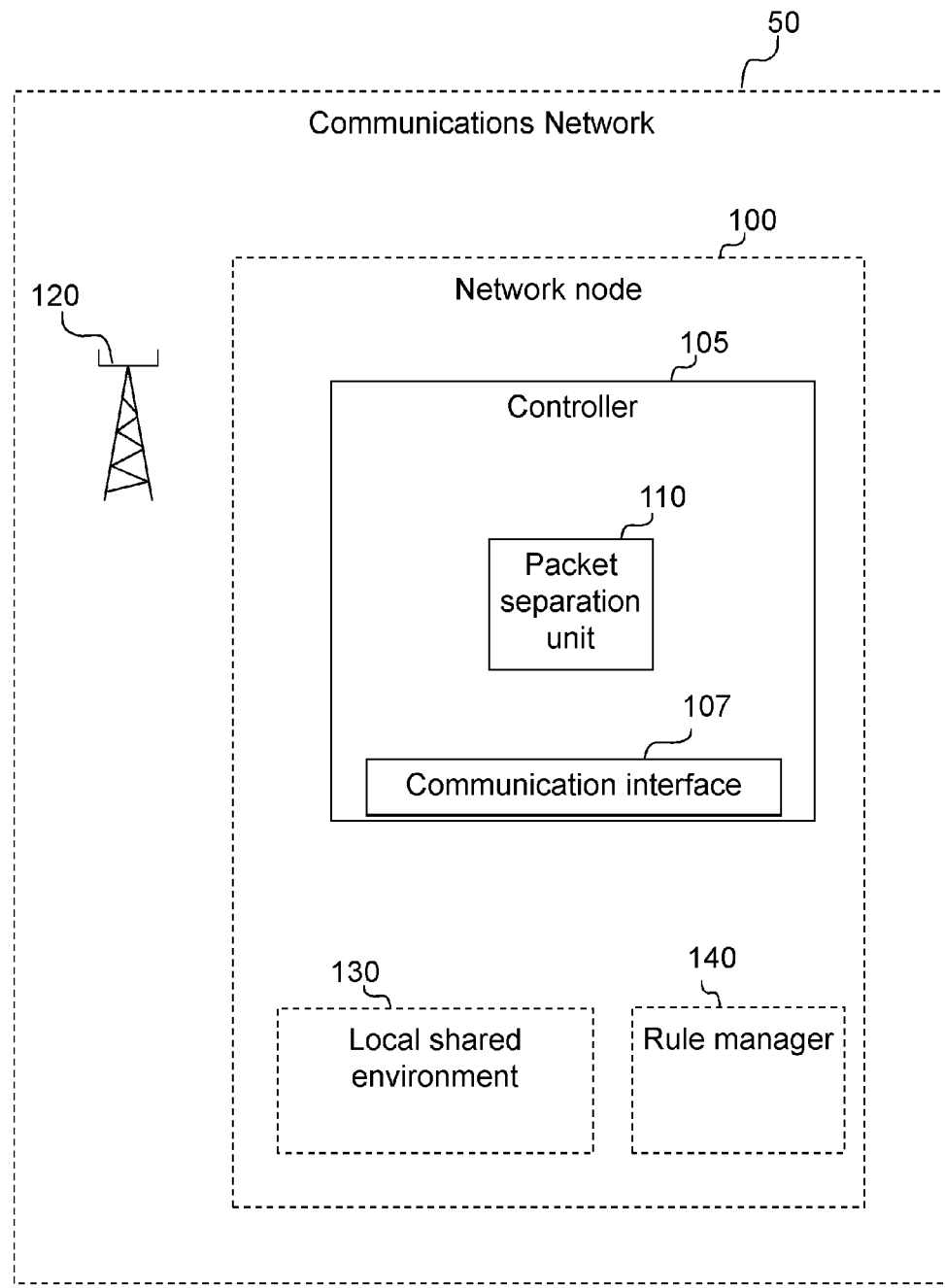
FIG. 4 is a block diagram illustrating, according to some further possible embodiments.

FIG. 4. Illustrates an overview of an embodiment of a controller 105 in a communications network 50.

Figure 5:
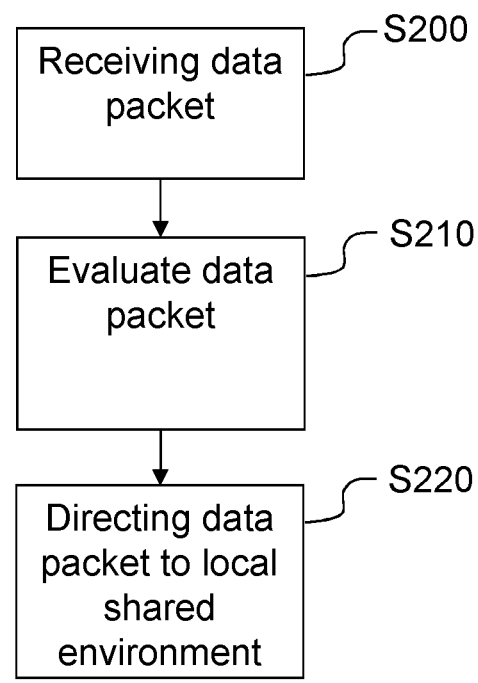
FIG. 5 is a flow chart illustrating a procedure in a controller, according to further possible embodiments.

FIG. 5 illustrates an embodiment of a method performed by the controller 105 in the communications network 50 for enabling of data traffic separation, the method comprises receiving S200 a data packet via a communication interface 107. The method comprises evaluating S210 the data packet with a traffic rule set in a packet separation unit 110 and, when the data packet complies with the traffic rule, directing S220 the data packet via the communication interface 107 to a local shared environment 120.

The controller may be arranged in a network node 100. The network node 100 may be a network node arranged to handle traffic in an access network of a communications network 50. The network node 100 may comprise one or a plurality of base stations 130. The network node 100 may comprise various network equipment, such as switches, routers, and/or management units.

The network node 100 comprising the controller 100 may also be located in the access network, such that one or a plurality of base stations 130 are connected to it. The network node 100 may also be located in the backhaul part of the network.

In an embodiment of the solution, the complimentary rule may be based on a hashed data structure.

In an embodiment of the solution, the method may comprise receiving a data packet to the packet separation unit 110. The data packet may be evaluated relative to the complimentary rule by the packet separation unit 110. When the evaluation indicates non-compliance, the data packet may be evaluated relative to the traffic rule set. When the evaluation data indicates compliance, the data packet may be directed the local shared environment.

When the data packet is evaluated relative to the complementary rule and concluded compliant, the data packet may be directed to the network core. This does not limit the data packet to pass other types of equipment, functions or evaluations along the way to the network core.

In an embodiment of the solution, compliance data may be associated with the data packet which indicates the complying traffic rule set.

In an embodiment of the solution, evaluation of a data packet may be performed based on at least one of: pattern matching, destination address, source address, destination port, source port, or user equipment ID.

In an embodiment of the solution, the traffic rule set may be common for data packets from a group of user equipment's. The traffic rule set may be individual for a data packet from a user equipment.

In an embodiment of the solution, the data packet is directed via a tunnel to the local shared environment.

Figure 6:
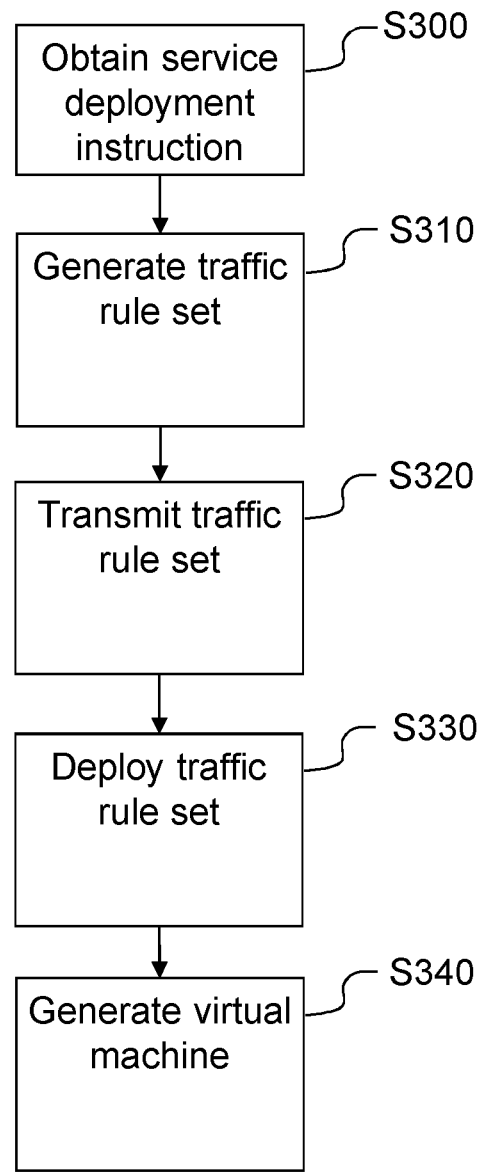
FIG. 6 is a flow chart illustrating a procedure in a system, according to further possible embodiments.

FIG. 6 shows an embodiment of the solution, with a method performed by a system in a communications network 50 for enabling of data traffic separation. The method comprises obtaining S300 a service deployment instruction by a resource manager 150. Generating S310 a traffic rule set based on the service deployment instruction by the resource manager 150. Transmitting S320 the traffic rule set to a rule manager 140 from the resource manager 150. Deploying S330 the traffic rule set in a packet separation unit 110 by the rule manager 140. Generating S340 a virtual machine 160 in a local shared environment 130 for reception of data packets complying with the traffic rule set by the resource manager 150. Thereby is data traffic separation enabled to a local shared environment 130.

The service deployment instruction may be obtained through different ways. One way is a manual decision by an operator and entering of an instruction by the operator, the instruction to deploy a service in a local shard environment 130. Another way to obtain a service deployment instruction is by an automatic decision by the resource manager 150. The resource manager 150 may determine that traffic or service utilization of a network node 100 or a base station 120 justify deployment of a service, or deployment of a service may be advantageous to off load the network core or the back haul network between the network access and network core.

A service deployment instruction may also be generated from another node in the network core, to offload the actual node. Examples may be soft switches, routers, content servers, not limiting to other nodes in the network core. A service deployment instruction may also be generated from an outside entity, for example another shard service or an external cloud.

Deployment of a new service in a local shared environment 130 may need an update of a traffic rule set. Deployment of a new service in a local shared environment 130 may need a new traffic rule set. The updated or new traffic rule set may enable the packet separation unit 110, to separate data traffic to a newly deployed service in the local shared environment 130. The update of the traffic rule set or the creation of a new traffic rule set may be performed by the resource manager 150.

The updated or newly generated traffic rule set may be transmitted from the resource manager 150 the rule manager 140. The rule manager 140 may deploy the traffic rule set in the packet separation unit 110. The resource manager may further generate a suitable virtual machine 160 in the local shared environment 130, for handling of data packets, separated by the packet separation unit 110 and directed to the local shared environment 130.

In an embodiment of the solution, the rule manager 140 may verify a new traffic rule consistency with the traffic rule set. To avoid contradictive rules it may be needed to verify that a new rule is consistent with exciting rules or a traffic rule set. Before a new rule or a new or updated traffic rule set is deployed in the packet separation unit 110, the consistency may be verified by the rule manager 140. The rule manager 140 may be located within the resource manager 150. The rule manager 140 may be located centrally in the core network. The rule manager 140 may be located in the local shared environment 130.

When the new traffic rule is deployed in the packet separation unit 110 and the virtual machine 160 is operational, the solution is enabled for reception of data packets for a new service.

In an embodiment of the solution, a data packet may be received by the traffic router unit 163 in the local shared environment. The traffic router unit 163 routes a received data packed based on compliance data associated with the data packet to a virtual machine related to the compliance data. The traffic router 163 may be operating firewall instructions provided from the rule manager 140, or provided from the resource manger 150. The traffic router 163 may be operating load balancing. The traffic router 163 may be operating load balancing instructions provided from the rule manager 140, or provided from the resource manger 150.

In an embodiment of the solution, for example as illustrated in FIG. 1, a packet separation unit 110 comprising processing means is provided in a communications network 50 for enabling of data traffic separation. The packet separation unit 110 is adapted to obtain a traffic rule set from a rule manager 140. The packet separation unit is adapted to determine a complementary rule related to the traffic rule set. The packet separation unit is adapted to arrange the rules in an hierarchical order such that a received data packet will be evaluated with the rule with the most likeliness to comply with a received data packet. The packet separation unit is adapted to receive the data packet. The packet separation unit is adapted to direct the data packet to a local shared environment 130.

In an embodiment of the solution, the complimentary rule may be based on a hashed data structure.

In an embodiment of the solution, the packet separation unit 110 may be adapted to receive a data packet. The packet separation unit may be adapted to evaluate the data packet relative to the complimentary rule and when the evaluation indicates non-compliance. The packet separation unit may be adapted to evaluate the data packet relative to the traffic rule set and when the evaluation data indicates compliance. The packet separation unit may be adapted to direct the data packet to the local shared environment 130.

In an embodiment of the solution, compliance data may be associated with the data packet which indicates the complying traffic rule set.

In an embodiment of the solution, the packet separation unit may be adapted to performed evaluation of data packets based on at least one of: pattern matching, destination address, source address, destination port, source port, or user equipment ID.

In an embodiment of the solution, the traffic rule set may be common for data packets from a group of user equipment's. The traffic rule set may be individual for a data packet from a user equipment.

In an embodiment of the solution, the packet separation unit 110 may be adapted to direct the data packet via a tunnel to the local shared environment.

In an embodiment of the solution, the processing means, comprised by the packet separation unit 110, may comprise a processor 250 and a memory 260. The memory 260 may contain instructions executable by the processor 250.

In an embodiment of the solution, for example illustrated by FIG. 3, a controller 105 comprising processing means is provided in a communications network 50 for enabling of data traffic separation. The controller 105 is adapted to receive a data packet via a communication interface. The controller 105 is adapted to evaluate the data packet with a traffic rule set in a packet separation unit and, when the data packet complies with the traffic rule, the controller 105 is adapted to direct the data packet via the communication interface to a local shared environment 130.

In an embodiment of the solution, the complimentary rule may be based on a hashed data structure.

In an embodiment of the solution, the controller 105 may be adapted to receive a data packet. The controller 105 may be adapted to evaluate the data packet relative to the complimentary rule. When the evaluation indicates non-compliance, the controller 105 may be adapted to evaluate the data packet relative to the traffic rule set and when the evaluation data indicates compliance, the controller 105 may be adapted to direct the data packet to the local shared environment.

In an embodiment of the solution compliance data may be associated with the data packet which indicates the complying traffic rule set.

In an embodiment of the solution, evaluation of a data packet may be performed based on at least one of: pattern matching, destination address, source address, destination port, source port, or user equipment ID.

In an embodiment of the solution, the traffic rule set may be common for data packets from a group of user equipment's. In an embodiment of the solution the traffic rule set may be individual for a data packet from a user equipment.

In an embodiment of the solution, the controller 105 may be adapted to direct the data packet via a tunnel to the local shared environment. In an embodiment of the solution, a controller such as the controller 105, comprising processing means, comprise a processor 250 and a memory 260 and the memory 250 may contain instructions executable by the processor 250.

In an embodiment of the solution, illustrated by FIG. 3, a system in a communications network 50 is provided for enabling of data traffic separation. The system comprises processing means adapted to obtain a service deployment instruction by a resource manager. The system comprises processing means adapted to generate a traffic rule set based on the service deployment instruction by the resource manager. The system comprises processing means adapted to transmit the traffic rule set to a rule manager from the resource manager. The system comprises processing means adapted to deploy the traffic rule set in a packet separation unit by the rule manager. The system comprises processing means adapted to generate a virtual machine in a local shared environment for reception of data packets complying with the traffic rule set by the resource manager. Thereby may data traffic separation be enabled to a local shared environment 130.

Figure 7:
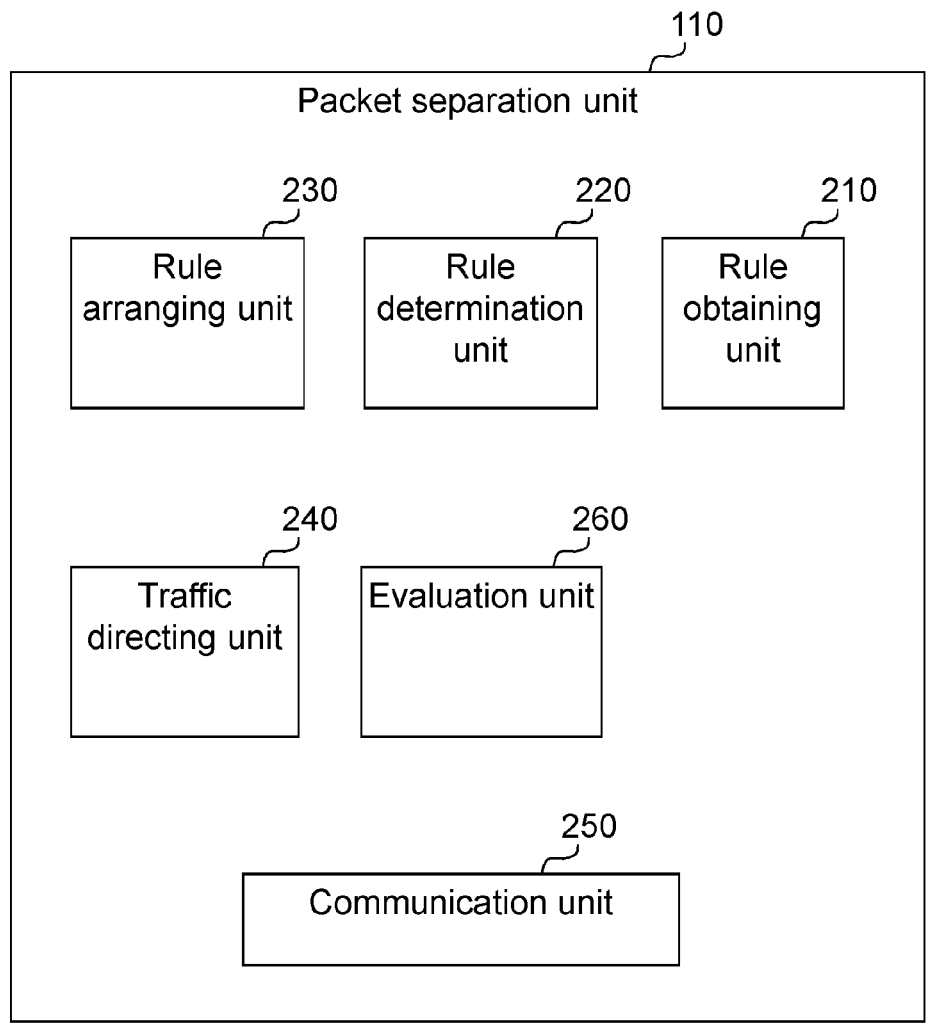
FIG. 7 is a block diagram illustrating further functional units in a packet separation unit, according to some further possible embodiments.

FIG. 7 shows an embodiment of the solution, with a packet separation unit, such as the packet separation unit 110, in a communications network for enabling of data traffic separation. The packet separation unit 110 comprises a rule obtaining unit 210 for obtaining a traffic rule set from a rule manager. The packet separation unit 110 comprises a rule determination unit 220 for determining a complementary rule related to the traffic rule set. The packet separation unit 110 comprises a rule arranging unit 230 for arranging the rules in an hierarchical order such that a received data packet will first be evaluated with the rule with the most likeliness to comply with a received data packet. The packet separation unit 110 comprises a traffic directing unit 240 for direction of a received data packet which complies with the traffic rule set to a local shared environment 130, instead of to a network core.

In an embodiment of the solution, for example illustrated in FIG. 3, a controller in a communications network for enabling of data traffic separation, such as the controller 105, The controller 105 comprises a communications interface 107 for reception of a data packet. The controller 105 comprises a packet separation unit 110 for evaluation of the data packet with a traffic rule set in the packet separation unit 110 and, when the data packet complies with the traffic rule. The controller 105 uses the communications interface 107 for direction of the data packet to a local shared environment 130.

In an embodiment of the solution, for example illustrated in FIG. 3, a system in a communications network 50 for enabling of data traffic separation. The system comprises a resource manager 150 for obtaining of a service deployment instruction. The system comprises the resource manager 150 for generation of a traffic rule set based on the service deployment instruction. The system comprises the resource manager 150 for transmission of the traffic rule set to a rule manager 140. The system comprises the rule manager 140 for deploying of the traffic rule set in a packet separation unit 110. The system comprises the resource manager 150 for generation of a virtual machine 160 in a local shared environment for reception of data packets complying with the traffic rule set. Thereby is data traffic separation to a local shared environment 130 enabled.

Figure 8:
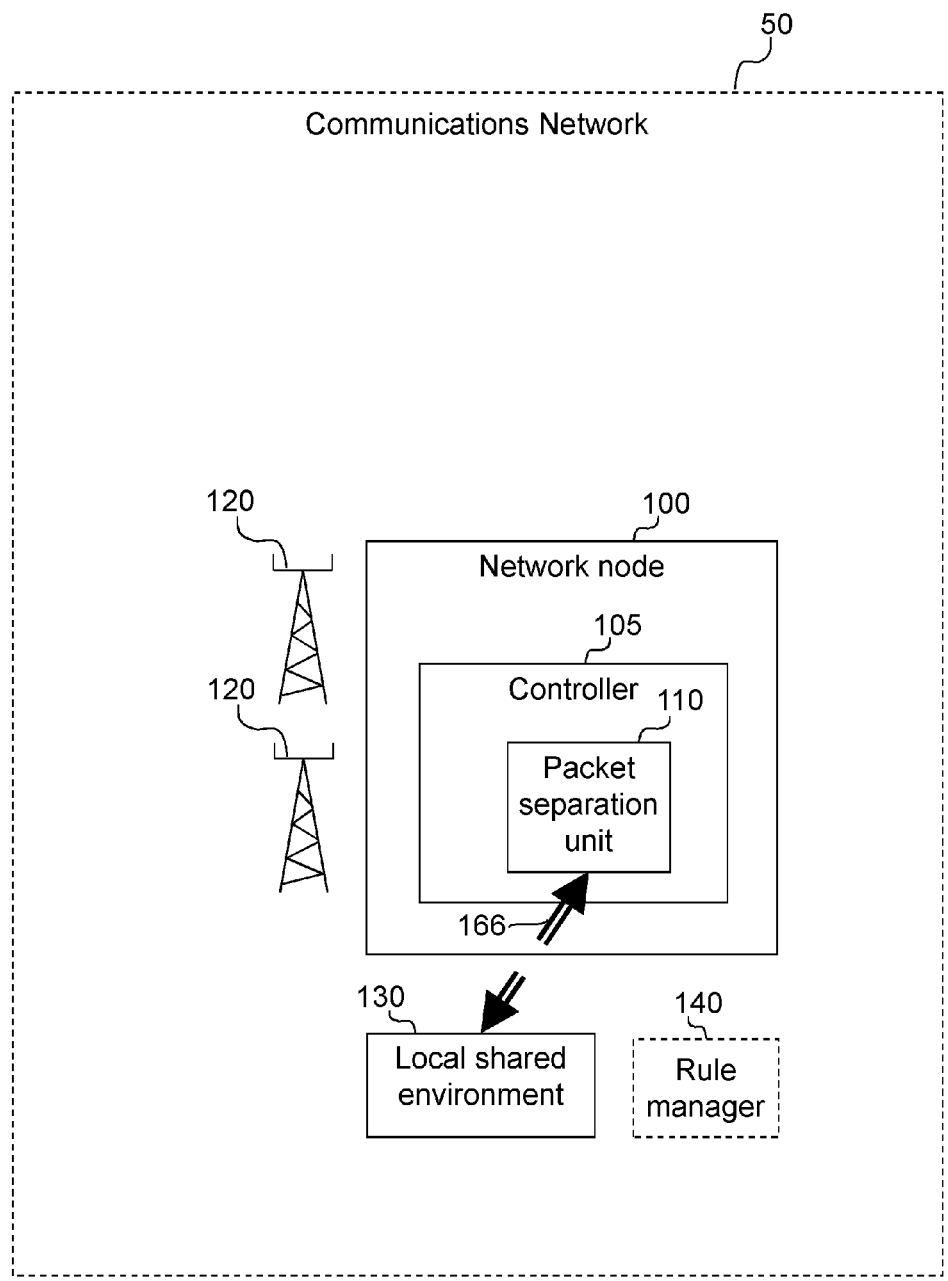
FIG. 8 is a block diagram illustrating the solution in access scenarios, according to some further possible embodiments.

FIG. 8 illustrates an embodiment with a plurality of base stations 120 connected to a network node 100. The network node 100 comprises a controller 105 and the controller 105 comprises a packet separation unit 110. The figure further shows the local shared environment 130 and the rule manager 140. The local shared environment would advantageously be located in the vicinity of the other parts. The rule manager may be located in the vicinity, or located somewhere else in the communications network, such as in the network core, or outside the particular communications network 50. The figure shows an example of configuration, where it should be understood that the person skilled in the art may configure the network node, the controller and the packet separation unit differently in relation to the base stations and the local shared environment. The network node 100, controller 105, packet separation unit 110, base station 120 and local shared environment 130 may be located in the radio network access (RAN) in a mobile network solution. The network node 100, controller 105, packet separation unit 110, base station 120 and local shared environment 130 may be located in the network access in an Internet solution.

Figure 9:
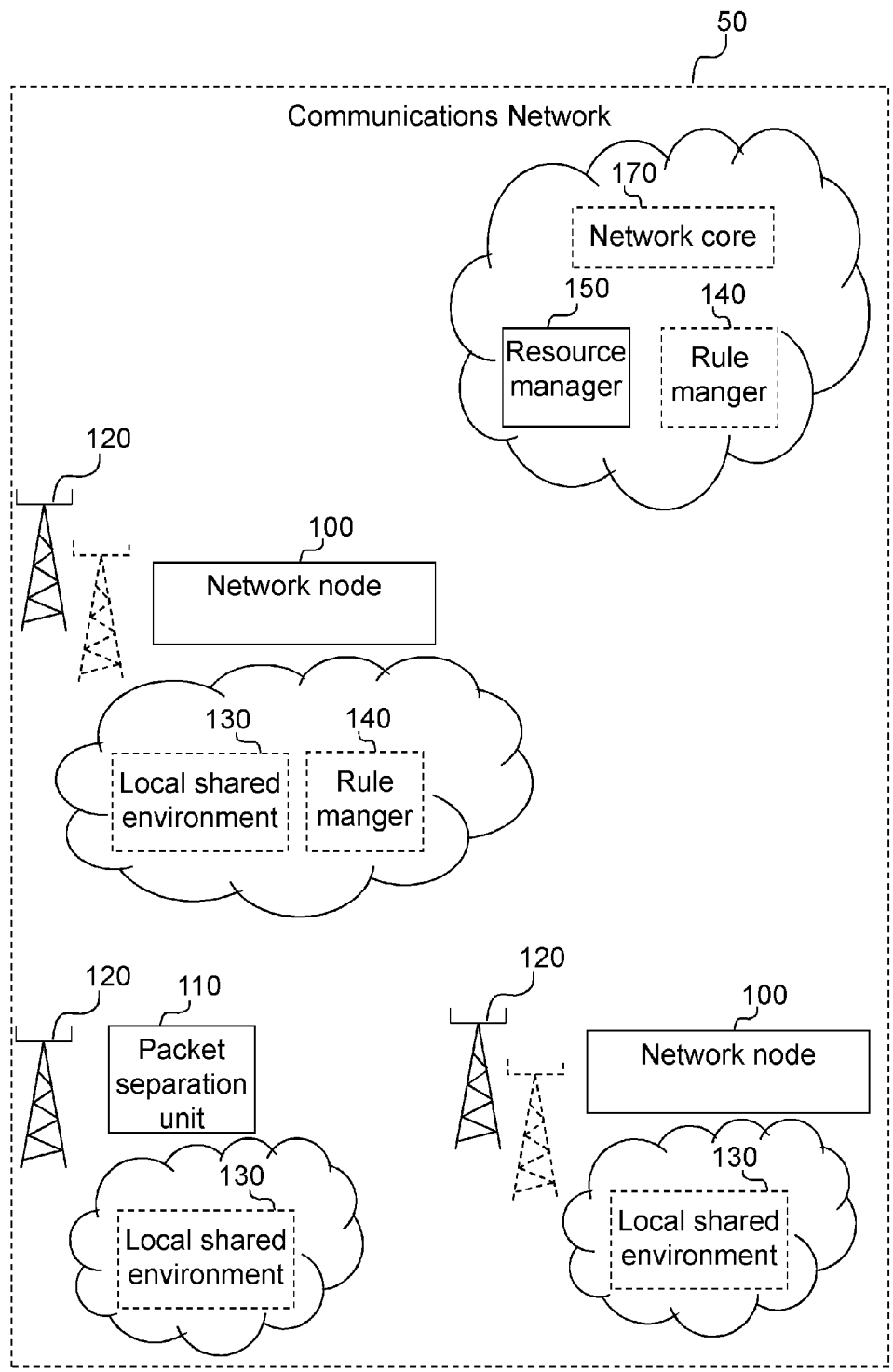
FIG. 9 is a block diagram illustrating the solution, according to some further possible embodiments.

FIG. 9 illustrates embodiments of the solution in a communications network 50. In an embodiment, a plurality of base stations 120 may be connected to a network node 100. A local shared environment 130 and a rule manager 140 may be co-located with the network node 100, or the local shared environment 130 and the rule manager 140 may be located in the vicinity of the network node 100. In an embodiment the plurality of base stations 120 may be connected to the network node 100, with the local shared environment in the vicinity. However, the rule manager 140 may be located somewhere else than near the local shard environment 130. The rule manager 140 is not handling data packet or other data traffic, and may therefore not necessarily be located close to the local shared environment 130, the network node 100 or the packet separation unit 110. In an embodiment, a single base station 130 may be connected to a packet separation unit 130. The packet separation unit 130 may be directing some of the data packets from the base station 120, to the local shared environment 130.

In an embodiment of the solution, the resource manager 150 may be located close to the network core, or in the vicinity of the network core, such as the network core 170 shown in FIG. 9. In a scenario where the rule manager 140 not is located with the local shared environment, the rule manager 140 may be located together with the resource manager 150. The resource manager 150 and the rule manger 140 may be located in the network core. The network core, such as the network core 170 shown in FIG. 9, the resource manger 150 and the rule manger 140, may be provided as part of a shared environment or computer cloud based services.

Figure 10A:
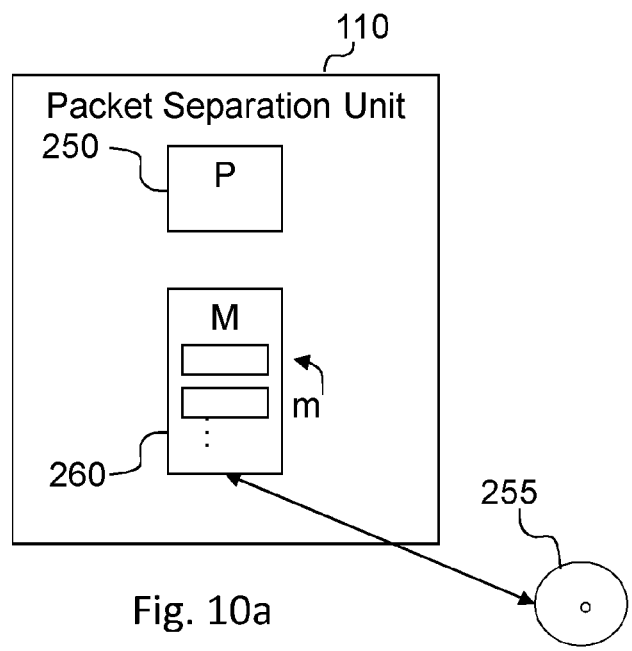
FIG. 10*a* is a block diagram illustrating a processor and a memory in a packet separation unit, according to possible embodiments.
Figure 10B:
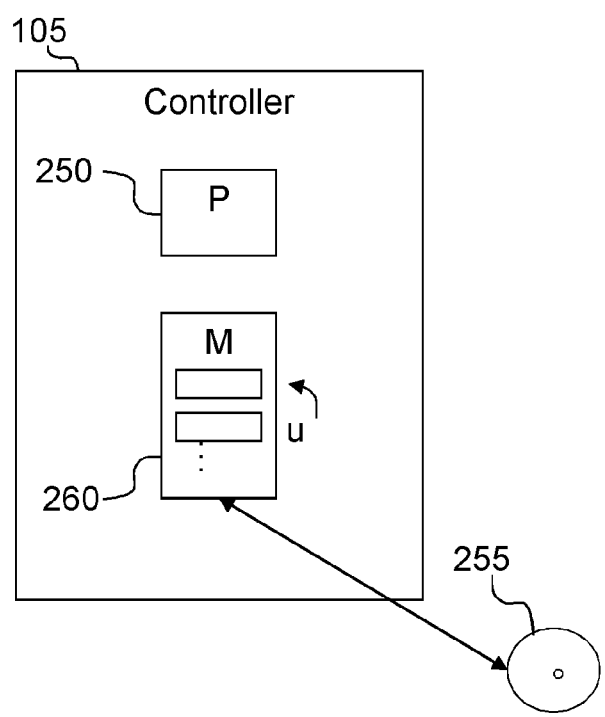
FIG. 10b is a block diagram illustrating a processor and a memory in a controller, according to possible embodiments.

Looking at FIG. 10a and FIG. 10b, the described controller 105 and the packet separation unit 110 described above may be implemented, by means of program units of a respective computer program comprising code means which, when run by processors "P" 250 causes the controller 105 and the packet separation unit 110 to perform the above-described actions. The processors P 250 may comprise a single Central Processing Unit (CPU), or could comprise two or more processing units. For example, the processors P 250 may include general purpose microprocessors, instruction set processors and/or related chips sets and/or special purpose microprocessors such as Application Specific Integrated Circuits (ASICs). The processors P 250 may also comprise a storage for caching purposes.

Each computer program may be carried by computer program products "M" 260 in the controller 105 and the packet separation unit 110, in the form of memories having a computer readable medium and being connected to the processor P. The computer program products may be carried by a medium 255, such as CD, DVD, flash memory, or downloadable objects. Each computer program product M 260 or memory thus comprises a computer readable medium on which the computer program is stored e.g. in the form of computer program units "u". For example, the memories M 260 may be a flash memory, a Random-Access Memory (RAM), a Read-Only Memory (ROM) or an Electrically Erasable Programmable ROM (EEPROM), and the program unit's u could in alternative embodiments be distributed on different computer program products in the form of memories within the controller 105 and the packet separation unit 110.

While the solution has been described with reference to specific exemplary embodiments, the description is generally only intended to illustrate the inventive concept and should not be taken as limiting the scope of the solution. For example, the terms "Packet separation unit", "Local shared environment" and "Data packet" have been used throughout this description, although any other corresponding nodes, functions, and/or parameters could also be used having the features and characteristics described here. The solution is defined by the appended claims.

The invention claimed is:

1. A method performed by a packet separation unit in a communications network for enabling of data traffic separation, the method comprising:
   obtaining a traffic rule set comprising at least one rule from a rule manager;
   determining a complementary rule related to the traffic rule set;
   arranging rules of the traffic rule set and the complementary rule in an hierarchical order such that a rule of the rules of the traffic rule set and the complementary rule with the most likeliness to comply with a received data packet, based on statistics of data packet compliance with individual rules, is first in the hierarchical order;
   receiving the data packet;
   evaluating the received data packet according to the hierarchical order so that the data packet is evaluated with the rule with the most likeliness to comply with the received data packet first; and based on the evaluation that the received data packet complies with a rule of the traffic rule set, directing the data packet to a local shared environment situated in a vicinity of an access network of the communications network.

2. The method according to claim 1, wherein the complimentary rule is based on a hashed data structure.

3. The method according to claim 1, wherein the evaluation of the data packet is performed based on at least one of: pattern matching, protocol, destination address, source address, destination port, source port, or user equipment ID.

4. The method according to claim 1, wherein either:
the traffic rule set is common for data packets from a group of user equipments or,
the traffic rule set is individual for a data packet from a particular user equipment.

5. The method according to claim 1, wherein the data packet is directed via a tunnel to the local shared environment.

6. The method according to claim 1, wherein based on the evaluation that the received data packet complies with the complementary rule, directing the data packet to a network core.

7. A method performed by a controller in a communications network for enabling of data traffic separation, the method comprising:
receiving a data packet via a communication interface;
evaluating the data packet in a packet separation unit, wherein the packet separations unit performs an obtaining step, a determining step and an arranging step prior to evaluating the data packet as follows:
obtaining a traffic rule set comprising at least one rule from a rule manager;
determining a complementary rule related to the traffic rule set;
arranging rules of the traffic rule set and the complementary rule in an hierarchical order such that a rule of the rules of the traffic rule set and the complementary rule with the most likeliness to comply with a received data packet, based on statistics of data packet compliance with individual rules, is first in the hierarchical order;
evaluating the received data packet according to the hierarchical order so that the data packet is evaluated with the rule with the most likeliness to comply with the received data packet first; and
based on the evaluation that the data packet complies with a rule of the traffic rule set, directing the data packet to a local shared environment situated in a vicinity of an access network of the communications network.

8. The method according to claim 7, wherein the complimentary rule is based on a hashed data structure.

9. A method performed by a system in a communications network for enabling of data traffic separation, the method comprising:
obtaining a service deployment instruction by a resource manager;
generating a traffic rule set based on the service deployment instruction by the resource manager;
transmitting the traffic rule set to a rule manager from the resource manager;
deploying the traffic rule set in a packet separation unit by the rule manager, wherein the packet separation unit performs the following steps:
obtaining the traffic rule set comprising at least one rule from the rule manager;
determining a complementary rule related to the traffic rule set;
arranging rules of the traffic rule set and the complementary rule in an hierarchical order such that a rule of the rules of the traffic rule set and the complementary rule with the most likeliness to comply with a received data packet, based on statistics of data packet compliance with individual rules, is first in the hierarchical order;
receiving the data packet;
evaluating the received data packet according to the hierarchical order so that the data packet is evaluated with the rule with the most likeliness to comply with the received data packet first; and
based on the evaluation that the received data packet complies with a rule of the traffic rule set, directing the data packet to a local shared environment situated in a vicinity of an access network of the communications network; and
generating a virtual machine in the local shared environment for reception of the data packet.

10. The method according to claim 9, wherein the rule manager verifies a new traffic rule consistency with the traffic rule set.

11. The method according to claim 9, wherein:
the data packet is received by a traffic router unit in the local shared environment, and wherein
the traffic router unit routes the received data packed based on compliance data associated with the data packet to the virtual machine related to the compliance data.

12. A packet separation unit in a communications network for enabling of data traffic separation, the packet separation unit comprising:
a processor;
memory containing instructions that, when executed by the processor, cause the packet separation unit to:
obtain a traffic rule set comprising at least one rule from a rule manager;
determine a complementary rule related to the traffic rule set;
arrange rules of the traffic rule set and the complementary rule in an hierarchical order such that a rule of the rules of the traffic rule set and the complementary rule with the most likeliness to comply with a received data packet, based on statistics of data packet compliance with individual rules, is first in the hierarchical order;
receive the data packet;
evaluate the received data packet according to the hierarchical order so that the data packet is evaluated with the rule with the most likeliness to comply with the received data packet first; and
based on the evaluation that the received data packet complies with a rule of the traffic rule set, directing the data packet to a local shared environment situated in a vicinity of an access network of the communications network.

13. The packet separation unit according to claim 12, wherein the complimentary rule is based on a hashed data structure.

14. The packet separation unit according to claim 12, wherein the evaluation of the data packet is performed based on at least one of: pattern matching, destination address, source address, destination port, source port, or user equipment ID.

15. The packet separation unit according to claim 12, wherein:
the traffic rule set is common for data packets from a group of user equipments or,
the traffic rule set is individual for a data packet from a particular user equipment.

16. The packet separation unit according to claim 12, wherein the data packet is directed via a tunnel to the local shared environment.

17. The packet separation unit according to claim 12, wherein based on the evaluation that the received data packet complies with the complementary rule, directing the data packet to a network core.

18. A controller in a communications network for enabling of data traffic separation, the controller comprising:
a processor;
memory containing instructions that, when executed by the processor, cause the controller to:
receive a data packet via a communication interface,
evaluate the data packet in a packet separation unit, wherein the packet separations unit performs an obtain operation, a determine operation and an arrange operation prior to evaluating the data packet as follows:
obtain a traffic rule set comprising at least one rule from a rule manager;
determine a complementary rule related to the traffic rule set;
arrange rules of the traffic rule set and the complementary rule in an hierarchical order such that a rule of the rules of the traffic rule set and the complementary rule with the most likeliness to comply with a received data packet, based on statistics of data packet compliance with individual rules, is first in the hierarchical order;
evaluate the data packet according to the hierarchical order so that the data packet is evaluated with the rule with the most likeliness to comply with the received data packet first; and
based on the evaluation that the data packet complies with a rule of the traffic rule set, direct the data packet to a local shared environment situated in a vicinity of an access network of the communications network.

19. The controller according to claim 18, wherein the complimentary rule is based on a hashed data structure.

20. A system in a communications network for enabling of data traffic separation comprising:
a processor;
memory containing instructions that, when executed by the processor, cause the system to:
obtain a service deployment instruction by a resource manager,
generate a traffic rule set based on the service deployment instruction by the resource manager,
transmit the traffic rule set to a rule manager from the resource manager,
deploy the traffic rule set in a packet separation unit by the rule manager, wherein the packet separation unit is configured to:
obtain the traffic rule set comprising at least one rule from the rule manager;
determine a complementary rule related to the traffic rule set;
arrange rules of the traffic rule set and the complementary rule in an hierarchical order such that a rule of the rules of the traffic rule set and the complementary rule with the most likeliness to comply with a received data packet, based on statistics of data packet compliance with individual rules, is first in the hierarchical order;
receive the data packet;
evaluate the received data packet according to the hierarchical order so that the data packet is evaluated with the rule with the most likeliness to comply with the received data packet first; and
based on the evaluation that the received data packet complies with a rule of the traffic rule set, direct the data packet to a local shared environment situated in a vicinity of an access network of the communications network; and,
generate a virtual machine in the local shared environment for reception of the data packet.

* * * * *